Nov. 15, 1966   G. F. OSTROOT   3,285,058
CONSISTENCY SENSING ELEMENT
Filed Jan. 28, 1964   5 Sheets-Sheet 1
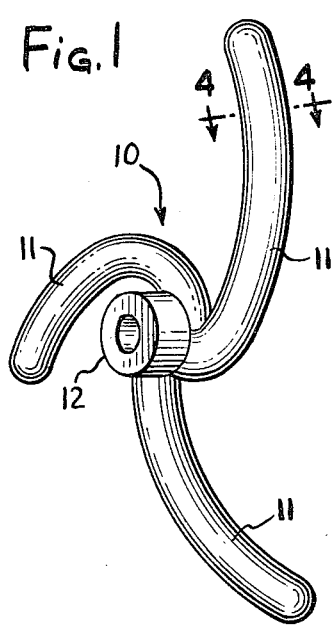
Fig. 1
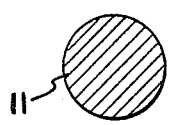
Fig. 4
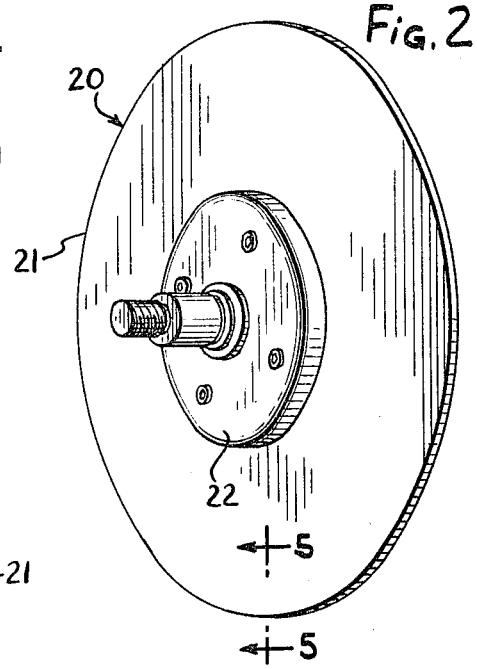
Fig. 2
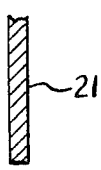
Fig. 5
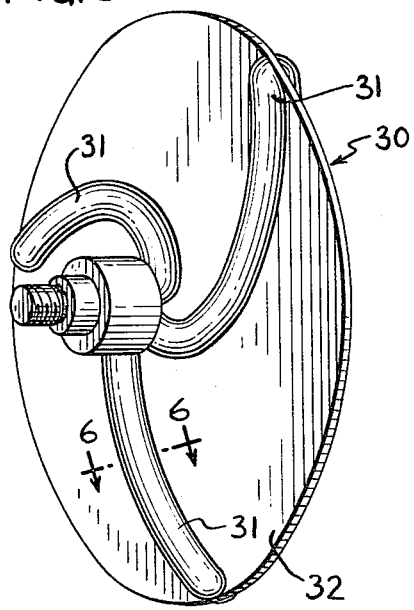
Fig. 3
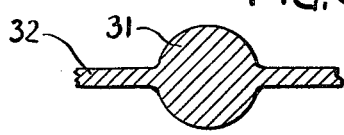
Fig. 6
Fig. 10
UNIFORM FLOW AROUND A CIRCULAR CYLINDER
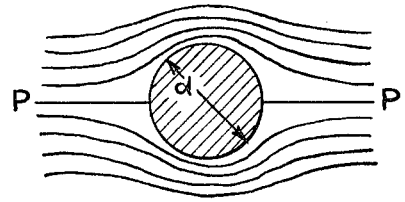
Fig. 11
EQUIVALENT FLOW PATTERN
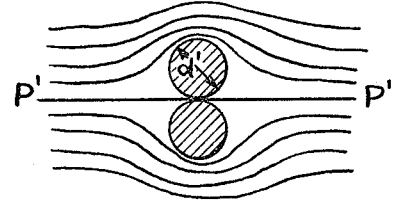
INVENTOR
GERALD F. OSTROOT
by: Wolfe, Hubbard, Voit & Osann
ATTYS Nov. 15, 1966  G. F. OSTROOT  3,285,058
CONSISTENCY SENSING ELEMENT
Filed Jan. 28, 1964  5 Sheets-Sheet 2

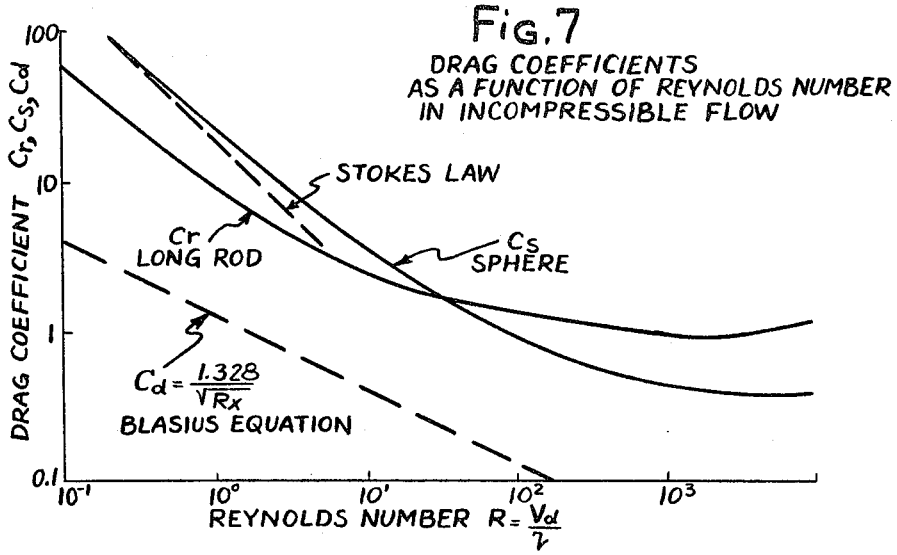

Fig. 7
DRAG COEFFICIENTS AS A FUNCTION OF REYNOLDS NUMBER IN INCOMPRESSIBLE FLOW

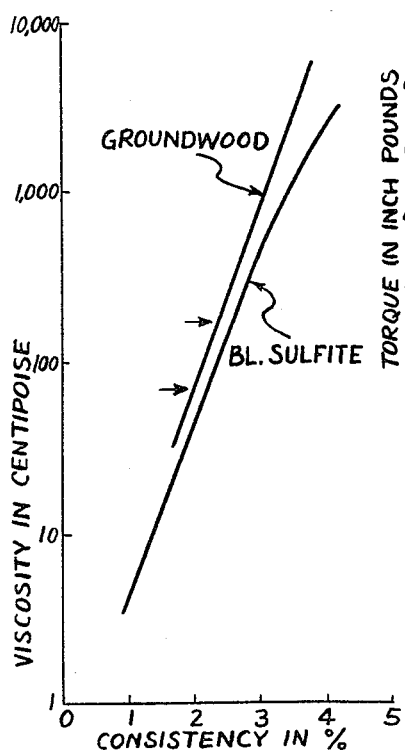

Fig. 8
EXPERIMENTALLY DERIVED VISCOSITY/CONSISTENCY RELATION FOR PULP.

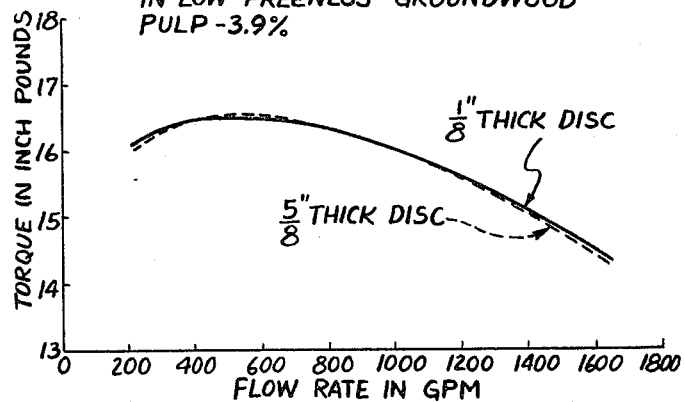

Fig. 9
DISC THICKNESS EVALUATION 10.5" DISCS IDENTICAL EXCEPT FOR THICKNESS RUN AT 190 RPM IN LOW FREENESS GROUNDWOOD PULP -3.9%

INVENTOR
GERALD F. OSTROOT by: Wolfe, Hubbard, Voit & Osann
ATTYS.

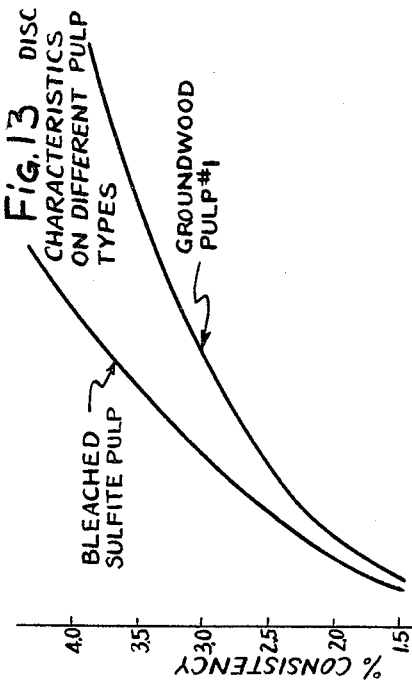
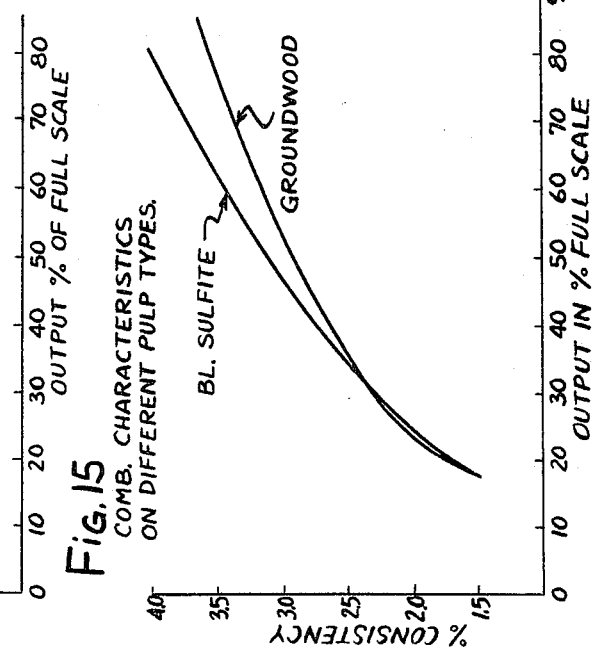
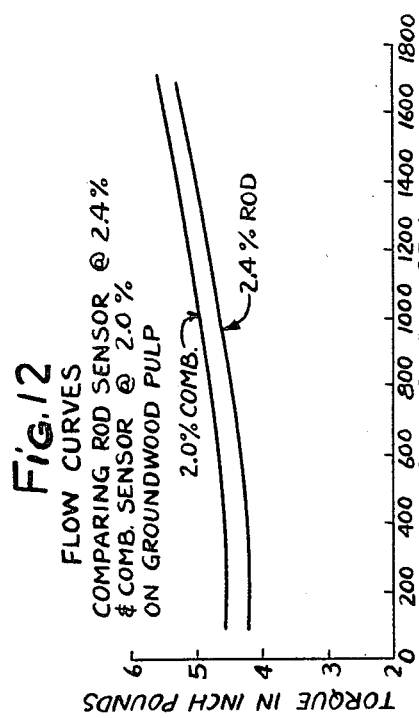
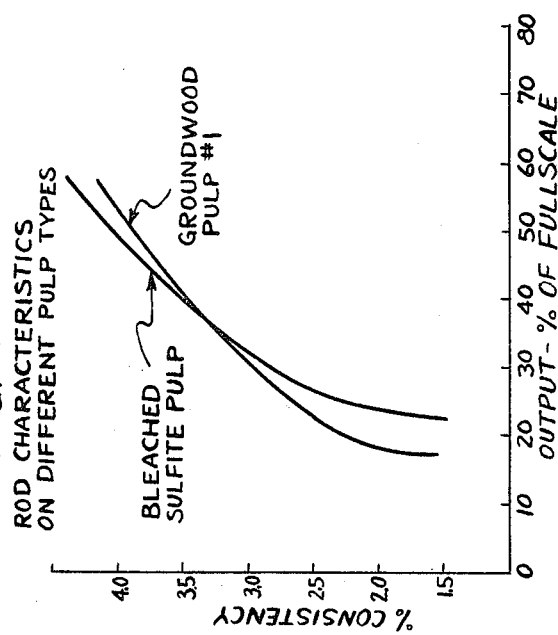

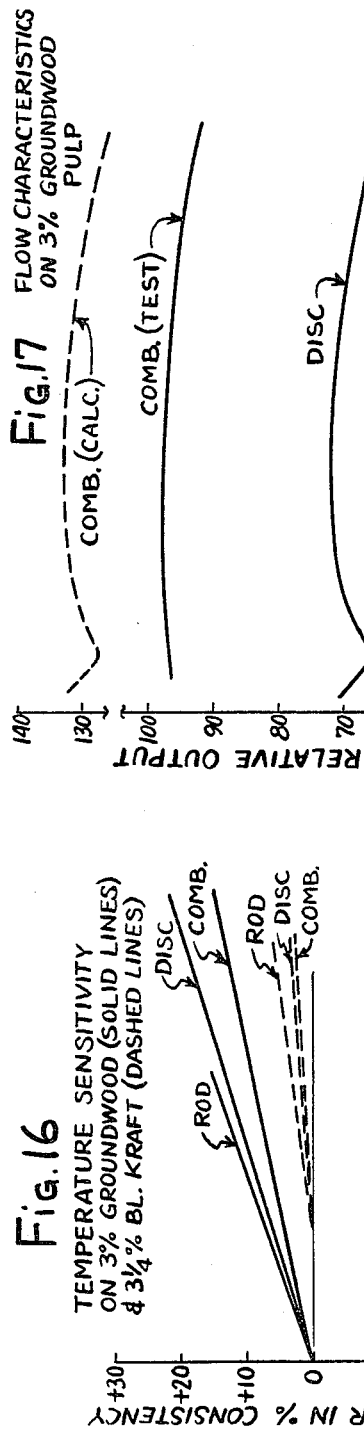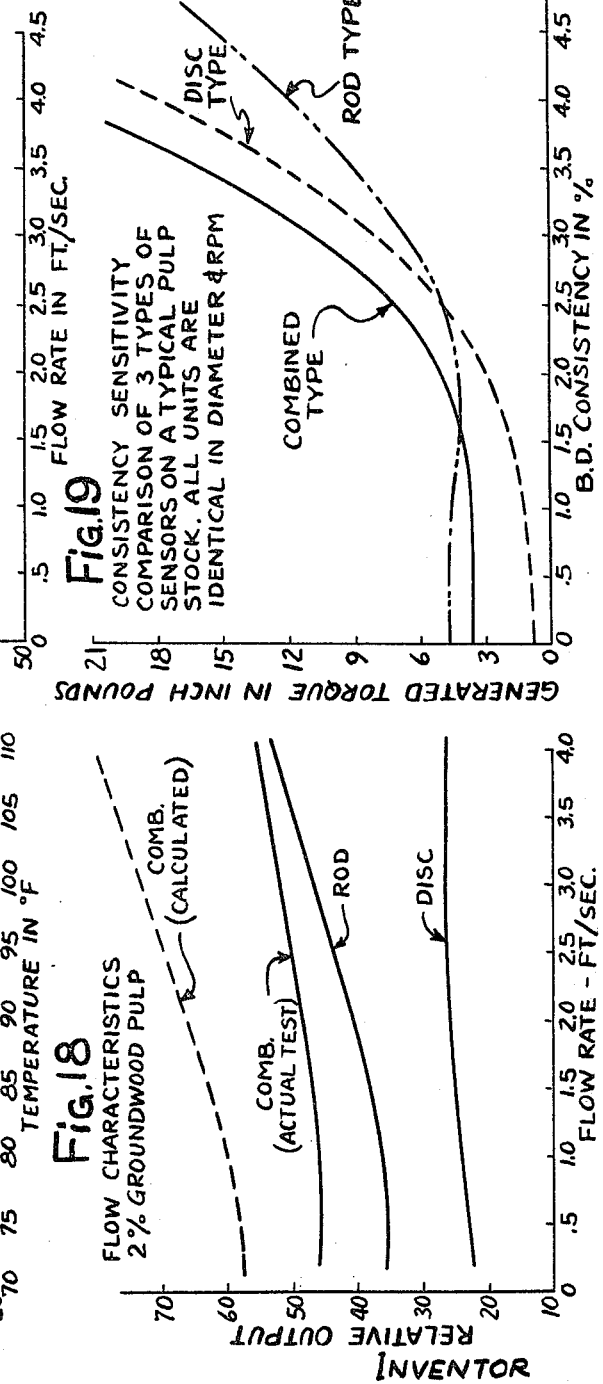

Nov. 15, 1966  G. F. OSTROOT  3,285,058
CONSISTENCY SENSING ELEMENT
Filed Jan. 28, 1964  5 Sheets-Sheet 5

Fig. 20

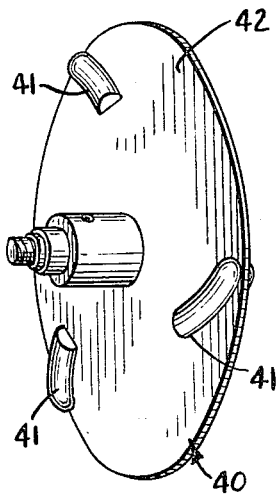

Fig. 22

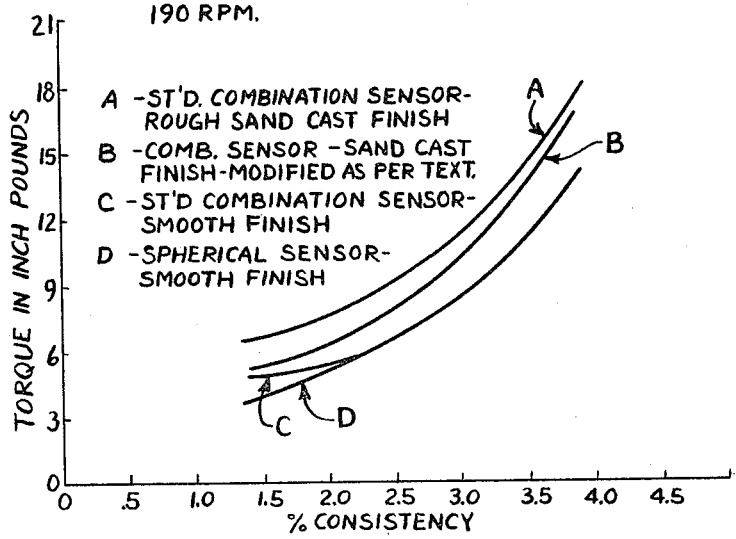

SENSITIVITY CURVES
ON BL. SOFTWOOD KRAFT PULP
AT 2.25 FT. PER SEC. FLOW RATE
& 10.5" DIA. SENSOR DRIVEN AT
190 RPM.

A - ST'D. COMBINATION SENSOR-
    ROUGH SAND CAST FINISH
B - COMB. SENSOR - SAND CAST
    FINISH - MODIFIED AS PER TEXT.
C - ST'D COMBINATION SENSOR-
    SMOOTH FINISH
D - SPHERICAL SENSOR-
    SMOOTH FINISH

Fig. 21

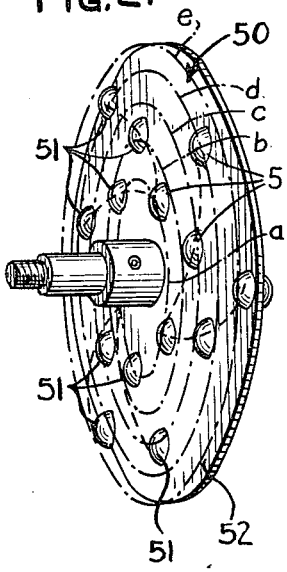

Fig. 23

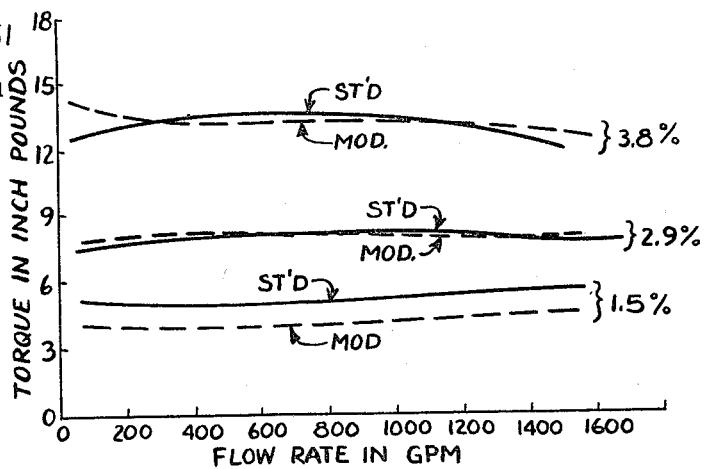

FLOW CHARACTERISTIC
COMPARING ST'D. FAB. COMB. SENSOR
& MODIFIED COMB. SENSOR ON BLEACHED
KRAFT PULP AT VARIOUS CONSISTENCIES

INVENTOR
GERALD F. OSTROOT
by: Wolfe, Hubbard, Voit & Osann
ATTYS.

United States Patent Office 3,285,058

Patented Nov. 15, 1966

3,285,058
CONSISTENCY SENSING ELEMENT

Gerald F. Ostroot, St. Cloud, Minn., assignor to De Zurik Corporation, Sartell, Minn., a corporation of Minnesota Filed Jan. 28, 1964, Ser. No. 340,688
8 Claims. (Cl. 73—59)

This invention relates to consistency measuring apparatus and more particularly concerns an improved sensing element for torque type consistency measuring equipment.

In many manufacturing and process control operations, as for example in the paper pulp industry, it is necessary to obtain accurate measurements and to continuously regulate the fluid consistency or proportion of a solid such as wood pulp suspended in a liquid or slurry made up primarily of water. The most accurate method for measuring consistency, of course, is by comparing the weight of the dried solid from a sample to the weight of the entire sample. However, since this measuring procedure depends upon separating the solid material from the liquid, drying it, and then comparing its weight to that of the original wet sample, a direct continuous measurement of the true consistency for the purpose of automatic process control cannot be made in this manner. Therefore, in order to obtain such continuous consistency measurements, the measuring device must depend on the measurement of some secondary property of the slurry which is related in some manner to the consistency.

During recent years, various related measurements have been attempted as an indication of slurry consistency. These include: optical devices to measure light transmission through the slurry; sonic or ultrasonic devices to measure attenuation; screening devices to measure the difference in level as the slurry flows through a screen; pipe friction devices to detect the head loss through a friction pipe; drag devices to measure the forces exerted by the flowing slurry; and torque devices to measure the work done or force exerted in moving a sensing element through the slurry. Of these, the most widely accepted form of consistency measuring device has been the torque sensing device. One such torque type consistency measuring device which has a high degree of accuracy is disclosed in copending application Serial No. 302,961, filed August 19, 1963, and assigned to the same assignee as the present application.

No matter how good the drive mechanism or torque measuring system, however, such devices can be no more accurate than the consistency sensing element. Since the sensing element is measuring a secondary property (such as apparent viscosity) as an indication of the actual consistency, any other variable within the slurry or process fluid which affects this secondary property will show up as an error in the consistency measurement. Desirably, the sensing element should have minimum response to variations such as: flow rate, freeness, temperature, pressure, air content and pH, and yet have maximum response to consistency change.

A great many types of sensing elements have, of course, been tried in an effort to find one that has maximum consistency sensitivity and minimum flow sensitivity, since these two are the major variables. The effects of the other variables upon the selected design have in the past been largely neglected because these effects are normally much smaller and more difficult to determine. However, new processes and more rigid quality standards throughout the control industry are now demanding even closer control and more accurate consistency measurements.

Accordingly, the principal aim of the present invention is to provide a new sensing element for a torque type consistency measuring device that has maximum response to consistency change and yet is relatively insensitive to changes in flow rate, temperature, pressure, freeness and other variables.

More particularly, it is an object to provide such a consistency sensing element that possesses stable operating characteristics at low flow rates and yet has low senstivity to flow changes at all consistency ranges. Another object is to provide such a sensing device that is relatively unsusceptible to turbulence errors.

A further object is to provide a sensing element of the above type that is not only mechanically strong and nonfouling in operation, but also which requires a low starting torque and yet develops a high torque output during operation.

Other objects and advantages of the invention will become more readily apparent upon reading the following detailed description and upon reference to the drawings, in which:

FIGURES 1 and 2 are perspective views illustrating the prior art rod and disc type sensing elements, respectively;

FIG. 3 is a perspective view of a new combination sensing element embodying the features of the present invention;

FIGS. 4–6 are enlarged partial cross sectional views of the effective sensing element shown in FIGS. 1–3, respectively;

FIG. 7 is a graphic representation of drag coefficients as a function of Reynolds number in an incompressible fluid;

FIG. 8 is a graphic illustration of the experimentally derived relation of viscosity to consistency for two types of paper pulp slurry;

FIG. 9 graphically illustrates the relationship between torque and flow rate for two disc type sensing elements of different thicknesses;

FIG. 10 is a schematic illustration of the uniform flow around a circular cylinder having a diameter $d$;

FIG. 11 is a diagrammatic illustration of the equivalent flow around two smaller cylinders of diameter $d/2$ separated by a plane P′—P′;

FIG. 12 is a comparison of the flow curves for a rod type sensor and a combination sensor at 2.4% and 2.0% consistencies, respectively;

FIGS. 13–15 graphically illustrate the output characteristics in relationship to consistency in two different pulp slurries for typical disc, rod and combination sensing elements, respectively;

FIG. 16 graphically illustrates the temperature sensitivity for typical rod, disc and combination sensors in two types of pulp slurry;

FIGS. 17 and 18 illustrate the flow characteristics for rod, disc and combination sensing elements in two types of paper pulp slurries, respectively;

FIG. 19 graphically illustrates consistency sensitivity for the rod, disc and combined type sensing elements;

FIG. 20 is a perspective view of a modified combination sensor also constructed in accordance with the present invention;

FIG. 21 is a perspective view of a disc and sphere type sensing element also embodying the present invention;

FIG. 22 graphically illustrates the sensitivity of the standard combination sensor compared with the modified combination sensor and the sphere type sensor of FIGS. 20 and 21, respectively; and FIG. 23 illustrates the flow characteristics of the standard combination and sphere type sensing elements at three different consistency levels.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, FIGURES 1 and 2 illustrate two prior art designs for sensing elements now being used on commercially available torque type consistency measuring devices, viscometers, and the like. As shown in FIGURE 1, the prior art rod type of consistency sensing element 10 consists of several round rods 11 projecting radially from a central hub 12. It will be understood that this sensing element is suspended within a slurry and relative motion between the rods and the slurry is induced by rotating the element. The rods 11, of course, may project radially from the hub or be bent along the plane of relative motion for a streamlining and self-cleaning effect. As shown here, the rods are curved along the path of a true involute generated from a point slightly offset from the center of rotation of the sensing element.

A prior art disc type sensing element 20 is shown in FIG. 2 and consists of a smooth flat plate 21, circular in shape, which is concentrically mounted on a hub portion 22. In use, this sensing element is also suspended within a slurry and rotated about an axis passing through the center of the circular plate.

THEORETICAL DEVELOPMENT

The operating characteristics of both the rod and the disc type sensing elements 10, 20 can be predicted by using accepted hydraulic theory. For example, the drag of a long rod moving relative to a liquid is described by the following formula:

$$\text{Drag} = CrA \frac{\rho V^2}{2} \quad (1)$$

where:

$Cr$ = a drag coefficient depending upon Reynolds number;
$A$ = projected area of the rod perpendicular to the direction of relative motion between the liquid and the rod;
$\rho$ = density; and
$V$ = relative velocity between the liquid and the rod The drag coefficient $Cr$ is a function of Reynolds number R shown in FIG. 7 as it appears in several accepted texts. This shows that the Reynolds number R, and thus the drag coefficient $Cr$ are dependent upon the relationship $$R = \frac{Vd}{\nu}$$

where:

$V$ = relative velocity between the liquid and rod;
$d$ = rod diameter; and
$\nu$ = kinematic viscosity which is analogous to consistency in a paper pulp slurry From these formulas and the curve shown in FIG. 7, it will be apparent that the rod type sensor 10 will be more sensitive to consistency changes if the rod diameter is small. This, of course, acts to reduce the Reynolds number and move the operating point to the left on the curve into an area of greater slope. Accordingly, the total drag, or torque, is reduced since it depends upon the cross sectional area. In turn, this requires additional rods in order to keep the torque at a measurable level. It will be appreciated, however, that the decrease in rod diameter soon reaches a practical minimum because the strength of the cantilevered rods drops sharply as the diameter is reduced.

In dealing with a two phase system such as a paper pulp slurry, for example, another factor must be considered in selecting the rod diameter. The agglomerative nature of the paper slurry limits minimum rod diameter since individual clusters of fiber will cling to the small rods and then break away after a brief period. This, of course, tends to result in an erratic output torque. In addition, if the rods project perpendicular to the direction of relative movement, another limiting diameter factor is caused by a relatively permanent fiber buildup around the leading edge of a small diameter rod such that the effective diameter will be considerably larger than the actual rod diameter.

The prior art disc type sensor 20 is not hampered by the same type of limitations as the rod type sensor 10 since the drag on a rotating disc parallel to the direction of flow is largely attributable to boundary layer phenomenon. Thus, the drag on a disc is described by the following formula:

$$\text{Drag} = Cdl\frac{\rho V^2}{2} \quad (2)$$

where:

$Cd = \frac{1,328}{Rx}$ = drag coefficient $Rx = \frac{Vx}{\nu}$ = Reynolds number at "$x$" distance along the plate $l$ = area of the disc per unit breadth
$\rho$ = density
$V$ = relative velocity between the liquid and the disc; and
$\nu$ = kinematic viscosity The theoretical variation for $Cd$ for laminar flow is shown in FIG. 7 as the graph of the Blasius equation. It will also be noted upon reference to FIG. 7 that the inflection point, which occurs at about $2 \times 10^3$ for the cylindrical rod, does not occur for the disc type sensor within the scope of this graph. Rather, the inflection point for a disc occurs at much higher Reynolds numbers. This, of course, means that the disc can operate successfully as a sensor at lower consistencies or at higher relative velocities than the rod type sensor.

Assuming that the peripheral diameter for the rod type sensor 10 is the same as the diameter of the disc type sensor 20, the value of $l$ for the disc (in Equation 2) will be approximately ten times greater than the value of A for the rod type sensor (in Equation 1). However, the torque outputs of the two types of sensors do not follow the same fixed relationship. Rather, the output torques follow the relationship between the products of $(l \times Cd)$ and $(A \times Cr)$, respectively. However, since $l$ is about ten times A, the torque outputs will be equal when $Cd$ is about $1/10 \times Cr$. This occurs at a Reynolds number of about 90 as shown in FIG. 7. Knowing V and $d$ for the rod type sensor we can now calculate the viscosity:

$$u(\text{cp.}) = \frac{4.5 \times .0625 \times (9.27 \times 10^4)}{90} \quad (3)$$

$u = 290$ cp.

At this point it should be mentioned that we are principally concerned with a two phase system such as a paper pulp slurry. However, the discussion and the equations presented thus far have been drawn from accepted hydraulic theory and have applied standard hydraulic terminology such as "viscosity" as a synonym for "consistency." The validity of this substitution is illustrated in FIG. 8 where an experimentally derived viscosity/consistency relationship for common ground wood and bleached sulfite pulp slurries has been plotted from laboratory tests on the rod type sensor 10. Returning now to Equation 3, therefore, we can predict that the point of equal torque for rod type sensor 10 and a disc type sensor 20 will occur at about 2.6 percent consistency when rotated in a ground wood pulp slurry. This has been verified by further laboratory tests which are graphically illustrated in FIG. 19 showing the comparison of consistency sensitivity of the rod type sensor 10 and the disc type sensor 20 on a typical pulp stock with the point of equal torque output occurring at 2.5 percent consistency.

It has also been found that the thickness of the disc does not enter into the determination of drag, or total torque, since we are dealing here with a boundary layer phenomenon. This fact has also been verified by laboratory tests which are graphically illustrated in FIG. 9 showing that no measurable affect on performance was found when the disc thickness was increased by a factor of 5 for two discs of identical diameter rotated at identical speeds in low freeness ground wood pulp.

As we have previously mentioned, the disc type sensor 20 can operate successfully at lower consistencies or higher relative velocities than the rod type sensor 10. This has also been demonstrated in laboratory tests and is illustrated in FIGURES 13 and 14. As shown here, the slope of the curve at any point is a measure of consistency sensitivity with a slope of zero being infinite sensitivity and an infinite slope being zero sensitivity. A comparison of the slopes of these curves at 1.5 percent consistency on ground wood pulp shows that the rod sensor 10 actually goes through the inflection point while the disc sensor 20 still retains usable sensitivity. However, this increased sensitivity and usefulness for the disc sensor 20 in the low consistency range is achieved at the sacrifice of other qualities.

In the low consistency range one practical problem of the disc type sensor 20 is the low absolute value of the torque signal. It is, of course, very difficult to measure the output signals in the low torque range. Returning again to the graph illustrated in FIG. 19, laboratory tests show that a typical disc type sensor 20 delivered torque output values of less than 2 inch pounds below the 1.5 percent consistency value. This problem is further compounded due to the fact that it is not practical to put two or more discs on a common shaft because the pulp slurry or fluid between the two discs exhibits erratic tendencies. Therefore, while a much larger disc could be installed, this must be done at the expense of larger bulk, higher cost and greater installation difficulties. Another problem with the disc type sensor 20 is the flow sensitivity encountered in the three percent and above consistency range which is illustrated graphically in FIG. 17.

From the above theoretical considerations and laboratory verifications of the experimental results, it will be appreciated that each type of sensing element has certain inherent characteristics due to its configuration. The relative advantages and disadvantages of the rod and disc type sensing elements 10, 20 may be compared in the following table.

These comparisons resulted from actual laboratory tests to obtain data on both the disc and rod type sensing elements that had identical maximum diameters and which were rotated at exactly the same velocities in known consistencies of a specific pulp slurry.

The graphs illustrated in FIGS. 13, 14 and 16–19 also illustrate some of the points listed in the above tables. Thus, FIGS. 13 and 14 show consistency sensitivity as well as sensitivity to change in furnish for both types of sensing elements. The slope of the line in each case indicates sensitivity at a particular consistency level. The vertical spread between the lines, of course, indicates the error in consistency introduced into a process by a change in furnish.

The graph in FIG. 16 shows the error induced by a change in the temperature of the process material for both the rod and disc type sensors. FIGS. 17 and 18 on the other hand, graphically illustrate the variation in developed torque as the process flow rate is changed. It will be seen that the ideal situation is approached by the plot of the rod type sensor 10 in FIG. 17, and for the disc type sensor 20 in FIG. 18. These graphs, of course confirm that both types of sensing elements have some very desirable characteristics and areas of application as well as certain inherent limitations.

NEW COMBINATION TYPE SENSOR

Turning now to FIG. 3 there is shown a new combination sensor element 30 embodying the features of the present invention. In mechanical appearance, the new combination sensor 30 appears to be simply a prior art disc type sensor 20 combined with a prior art rod type sensor 10 with the disc inserted at the rod centers such that the axis of rotation of the two sensors coincides. However, as will appear in the following discussion, the new combination sensor 30 has many advantages over either the prior art rod type sensor 10 or the prior art disc type sensor 20 and it achieves these advantages through characteristics that are neither the mechanical nor the theoretical summation of the similar characteristics of the prior art sensing elements.

By superimposing a plurality of rods 31 upon a disc surface 32, the boundary layer development over the disc surface has been severely limited. As shown in FIG. 3,

TABLE I.—RELATIVE ADVANTAGES OF ROD AND DISC TYPE SENSING ELEMENTS

| | Disc Type | | Rod Type |
|---|---|---|---|
| 1 | Good consistency sensitivity above 1.50%. | 1 | Good consistency sensitivity above 2.50%. |
| 2 | Lower sensitivity to flow changes below 2.25% consistency. | 2 | Lower sensitivity to flow changes above 2.50% consistency. |
| 3 | Mechanically strong. | 3 | Mechanically strong. |
| 4 | Not susceptible to fouling from process contaminants. | 4 | Stable operation at low flow rates. |
| 5 | Low pressure drop to process flows. | 5 | Ability to be used in process flows directed either parallel to or perpendicular to the plane of rotation. |
| 6 | Low susceptibility to errors from minor turbulence in process flow. | 6 | Low pressure drop. |
| 7 | Low starting torque. | 7 | Ability to be cascaded on a single shaft for higher sensitivity and larger torque output in perpendicular process flow. |

TABLE II.—RELATIVE DISADVANTAGES OF ROD AND DISC TYPE SENSING ELEMENTS

| | Disc Type | | Rod Type |
|---|---|---|---|
| 1 | Tendency toward erratic operation at low process flows. | 1 | Susceptible to fouling by process contaminants (strings, rags, etc.). |
| 2 | Highly sensitive to changes in furnish of freeness. | 2 | Sensitive to furnish or freeness change below 2¾% consistency. |
| 3 | Sensitive to temperature changes. | 3 | Sensitive to temperature changes. |
| 4 | Flow direction of process material must be parallel to plane of disc. | 4 | Limited use in low consistency (below 2½%). |
| | | 5 | High start up torque. | the exposed area of the disc element 32 between the rod elements 31 is substantially greater than the area occupied by the rod elements. Nevertheless, it has been found that the disc element 32 in the combination sensor 30 actually contributes very little to the generated torque output. Rather, the primary function of the disc element is to hydraulically divide the rod elements 31 into two smaller independently acting rods, without physically separating them. Thus, the new combination sensor 30 is able to achieve a desired hydraulic performance even though the required physical changes necessary to achieve this performance were not heretofore practical.

SCHEMATIC DERIVATION

The unique hydraulic characteristics of the new combination sensor 30 can best be explained in connection with the schematic illustrations in FIGS. 10 and 11 taken in conjunction with the previously discussed theoretical development of both the prior art rod and disc type sensors 10, 20. For example, a typical flow pattern for uniform flow around a rod having a diameter $d$ is shown in FIG. 10. The desirability for reducing this rod diameter has been previously discussed and the limitations on minimum diameter have also been considered. However, if a solid boundary or disc 32 is now inserted along the plane P—P, the stream lines or flow pattern will not be altered. The only change in this case is that the flow above the plane P—P will be independent from the flow below the plane P—P which means that the Reynolds number can now be calculated independently for each half of the rod.

For the sake of simplicity, the system described above in connection with FIG. 10 can now be approximated as shown in FIG. 11 where two rods of diameter $d/2$ are superimposed on opposite sides of a plane P'—P'. This, of course, leads to a Reynolds number calculation far different from the original calculation on the prior art rod type sensor 10. Since the rod diameter in FIG. 11 is now only one half of the diameter $d$ originally used in connection with Equation 1 while V and $u$ remain the same, the Reynolds number is also half. Once this fact is appreciated, certain results for the new combination sensor 30 can be predicted on the basis of the equivalent flow pattern shown in FIG. 11.

Referring back to FIG. 7, it will be seen that the operating point on the curce Cr will now be shifted to the left by the smaller Reynolds number. This results in a larger drag coefficient and an increase in sensitivity as determined by the slope of the curve. The total drag, however, is still proportional to the cross sectional area and the drag coefficient as listed in formula (1) discussed above. The cross sectional area of the schematic element shown in FIG. 11 is unchanged, however, since there are now simply two rods each with one half the diameter of the rod shown in FIG. 10. Therefore, since the area is unchanged and the drag coefficient has increased, the total drag generated by the combination sensor of FIG. 11 will be higher than that generated by the rod type sensor of FIG. 10 at the same consistency. In addition, because the operating point has moved to the left on FIG. 7, the combination sensor will be more consistency sensitive than the rod type sensor and will retain usable sensitivity at lower consistency levels. This relationship remains true until a reversal point is reached at high Reynolds numbers.

EXPERIMENTAL VERIFICATION

Actual laboratory tests have also shown that the approximation of the combination sensor in FIG. 11 is a valid representation for the actual case as shown in FIG. 10 with the plane P—P added. In other words, the new combination sensor 30 exhibits characteristics that are compatible with the theory developed in connection with the FIG. 11 schematic combination sensor. This relationship is best shown in FIG. 19 which shows that the total drag or torque of the combination sensor 30 is higher than that of the rod type sensor 10 at comparable consistency levels. Furthermore, the slope of the combination sensor curve is greater at any one consistency indicating a higher sensitivity. It will also be noted that the combined sensor retains usable sensitivity at lower consistency values.

Further evidence of the advantages of the new combination sensor 30 is shown in the graphic illustration of FIG. 12. This graph compares the flow curves for a rod type sensor 10 at 2.4 percent consistency to a combination sensor 30 at 2.0 percent consistency. The curves are almost identical and, accordingly, this confirms the soundness of the preceding derivation and approach.

This comparison can also be justified on the following basis. The effective cross section of the rod type sensor 10, the disc type sensor 20 and the combination sensor 30 are illustrated in FIGS. 4–6, respectively. In the laboratory test models, which were used to verify the hydraulic performance of the new combination sensor 30, the rods were ¾" in diameter and the plate had a thickness of ⅛". The combination sensor 30 as illustrated in cross section in FIG. 6 therefore has a projection of ⁵⁄₁₆" above the plate 32. Thus, the Reynolds calculation:

$$Re=\frac{Vd}{\nu}$$

where: V and $\nu$ are constant reduces to $Re=Kd$. Accordingly, a comparison of the rod type and combination sensors can now be set up as follows:

$$\frac{Re\ (\text{rod})}{Re\ (\text{comb})}=\frac{Kd\ (\text{rod})}{Kd\ (\text{comb})}=\frac{K\%_4}{K\%_{16}}=C\times 2.4 \quad (4)$$

In other words, the Reynolds number of the illustrative rod type sensor 10 will be 2.4 times larger than that for the illustrative combination sensor 30.

In order to compare the flow curves for the rod type and combination type sensors they must both be at the same Reynolds number. This can now be done by increasing the apparent viscosity for the rod type sensor 10 by the ratio of 2.4:1. Referring again to FIG. 8, it will be seen that 2% consistency=70 cp. viscosity for groundwood pulp. Therefore, 2.4×70 cp.=168 cp. which is equal to about 2.35% consistency. As previously mentioned, this basic comparison has been verified by actual laboratory tests, as shown in FIG. 12.

The unique results achieved by the new combination sensor 30 can also be explained in another way. For example, in a rod type sensor 10, a reduction in rod diameter was known to be desirable in order to increase consistency sensitivity, to maintain sensitivity at lower consistency levels and to reduce flow sensitivity. However, this physical change in the rod type sensor 10 was not practical because of the loss of mechanical strength, loss of total torque, erratic torque produced by variable pulp buildup, and the buildup of pulp which acts to limit the minimum rod diameter.

The new combination sensor 30, on the other hand, has produced a hydraulic illusion of the required physical changes without any of these objectionable features. In addition, the new combination sensor 30 has several other advantages including: the elimination of fouling due to process contaminants such as strings or rags, increased mechanical strength over either of the prior art sensors 10, 20 and an increase in torque output from a single sensing element with no increase in size. It will now be appreciated that the result is an improved consistency sensor 30 having unique and unexpected hydraulic characteristics.

A tabulation of the characteristics of the combination sensor 30 is presented in Table III and may be compared with the advantages and disadvantages listed for the rod and disc type sensors in Tables I and II.

TABLE III.—RELATIVE ADVANTAGES AND DISADVANTAGES OF COMBINATION SENSOR

| | Advantages | | Disadvantages |
|---|---|---|---|
| 1 | Good sensitivity above 1.5%. | 1 | Flow direction must be parallel to plane of the disc. |
| 2 | Low sensitivity to flow changes at all consistency ranges. | 2 | More sensitive than plain rod to furnish changes above 2¾% consistency. |
| 3 | Mechanically strong. | | |
| 4 | Non-fouling. | | |
| 5 | Low pressure drop to parallel flow. | | |
| 6 | Low susceptibility to turbulence errors. | | |
| 7 | Low starting torque. | | |
| 8 | Stable operation at low flow rates. | | |
| 9 | Low sensitivity to temperature changes. | | |
| 10 | Low sensitivity to furnish change below 2¾% consistency. | | |
| 11 | Higher operating torque per unit. | | |

Many of these tabulated advantages of the new combination sensor 30 are also graphically illustrated in FIGS. 15–19. Thus, FIG. 15 graphically shows the consistency/output characteristics for the combination sensor 30 which may be compared to similar graphic illustrations in FIGS. 13 and 14 for the disc type sensor 20 and rod type sensor 10, respectively. The vertical displacement between the bleached sulfite curve and ground wood pulp curve indicates the consistency error introduced by changing from one pulp type to another, or furnish change. In this regard, the combination sensor 30 shows very definite improvement over the disc type sensor 20 in the area of furnish sensitivity. In addition, the combination sensor shows less error than the disc sensor 20 throughout its range. Furthermore, the combination sensor shows less error than the rod type sensor 10 below 2.75 percent consistency. Since most of the critical control problems will typically occur in these lower ranges, this desirable characteristic of the combination sensor 30 can be readily appreciated.

The new combination sensor 30 has also been found to have better temperature sensitivity characteristics than either the rod type sensor 10 or the disc type sensor 20, as shown in FIG. 16. Furthermore, it will be noted that the combination sensor 30 is less sensititve to temperature changes in both the ground wood pulp slurry and the bleached kraft paper slurry than either of the other two prior art sensing devices.

A comparison of the flow characteristics of the new combination sensor 30 and the prior art rod type sensor 10 and disc type sensor 20 is graphically illustrated in FIG. 17 for a 3% ground wood pulp slurry and in FIG. 18 for a 2% ground wood pulp slurry. An examination of FIGS. 17 and 18 will also clearly illustrate that the combination sensor has a relative output that is significantly higher than either the output from the rod type sensor 10 or the disc type sensor 20. Furthermore, it will be noted that the combination sensor 30 exhibits an output in both cases which is not equal to the algebraic sum of the individual rod and disc type sensors as plotted in the dash line curve in FIGS. 17 and 18.

Other advantages may also be noted from FIGS. 17 and 18. It is obvious that the plotted curve for the actual combination sensing element 30 does not follow the same pattern as the calculated curve. In FIG. 17, for example, the low flow end of the actual combination sensor curve is entirely different from the calculated curve. In FIG. 18, on the other hand, the slope of the curve has changed. In both cases, the actual test results are more desirable than the calculated result in that the combination sensor 30 displays less sensitivity to change in flow velocity.

From the above discussion, it will now be readily apparent that the graphs illustrated in FIGS. 17 and 18 clearly indicate that it is not possible to find any algebraic combination of the prior art rod and disc type sensor curves that will duplicate the actual test curves for the new combination sensor 30. This is, of course, a positive indication that the new combination sensor 30 is something more than a simple combination of two existing sensors 10 and 20 constructed to obtain the advantages of each. Rather, by superimposing the rods upon the disc surface the boundary layer development over the disc surface has been altered with the result being a new sensing element 30 which has new and unexpected hydraulic characteristics.

Throughout the foregoing discussion the examples and the graphic illustrations were drawn from the paper pulp industry where the new combination sensor 30, which embodies the present invention, was developed, tested and found to have outstanding characteristics in solving the problems associated with continuous consistency measurements of a paper pulp slurry. As previously mentioned, such a slurry is basically a two phase system composed principally of solids (pulp fibers) dispersed in a liquid (mostly water). Since the new combination sensor 30 hydraulically divides the flow on opposite sides of the plate 32, many of the problems attributable to the agglomerative nature of the solid slurry particles have been overcome.

It will also be appreciated however, that the theory and derivation of the new combination sensor has been based upon well accepted hydraulic principles. Accordingly, many of the outstanding performance characteristics of the new combination sensor also follow during operation in other types of fluid media to obtain continuous measurements of viscosity, apparent viscosity or other fluid characteristics.

MODIFICATIONS

In view of the preceding discussion of the development and advantages of the new combination consistency sensing element 30, it will be readily appreciated that other sensing element embodiments may be constructed according to the teachings of the present invention. Two such illustrative embodiments are shown in FIGS. 20 and 21.

Turning first to FIG. 20, there is shown a modified combination sensing element 40 which also embodies the invention. The sensing element 40 includes a plurality of projections in the form of short rods 41 carried by a circular plate 42 so as to extend equally from the opposite surfaces of the plate. The similarities between the modified sensor 40 and the combination sensor 30 will, of course, be readily apparent. In fact, the modified sensor was formed by simply removing the inner end portions of the rod-like elements from opposite sides of the plate so as to leave smooth plate surfaces adjacent the hub.

As those skilled in the art will appreciate, the inner end portion of the rods in a prior art rod type sensor 10 contributes very little to the total sensor output. The explanation for this is because the inner rod portions rotate at a much lower relative velocity than the outer rod portions with respect to a fluid in which the sensing element is submerged. In addition, the inner rod portions act through a much shorter moment arm than the outer rod portions. Since these two factors are cumulative in nature, it will be seen that the inner rod portions produce only a very small part of the total torque output.

In the combination sensor 30, the inner rod portions add little to the total torque output for substantially the same reasons as discussed above in connection with the prior art rod type sensor 10. Moreover, if these inner rod portions are removed, as in the case of the modified sensor 40, the disc 42 carries the outer rod portions 41 through the fluid with greatly reduced hub losses. Largely because of this attribute, the modified combination sensor 40 achieves slightly better consistency sensitivity than the combination sensor 30.

FIGURE 22 graphically illustrates this consistency sensitivity comparison between a modified sensor element 40 and the previously discussed combination sensor 30. Thus, the slope of curve B for the modified sensor 40 is greater at any consistency level than the slope of curve A for the combination sensor 30.

Turning now to FIG. 21, there is shown another embodiment of a sensing element 50 constructed in accordance with the teachings of the present invention. As shown here, the sensing element 50 is formed with a plurality of small balls or spheres 51 carried by a disc 52 so that substantially hemispherical portions of the balls project equally from opposite sides of the disc. It will be apparent, of course, that the disc 52 acts to hydraulically divide the flow of fluid so that independent flow lines are established on each side of the disc in substantially the same manner as previously described. In the illustrated embodiment, the spheres 51 are located on the disc 52 along involute-like paths (shown in dash lines) with pairs of the paths intersecting at the center of a common sphere located in offset relation from the disc hub. Preferably, the spheres 51 are also disposed on the disc 52 in a plurality of concentric circles. Thus, as illustrated in FIG. 21 the sensing element 50 includes fifteen spheres (one of which is hidden by the hub) with three spheres located on each of five concentric circles a–e shown here in dot-dash lines.

A schematic derivation of the modified sphere type sensor 50 could be set forth similar to the derivation of the combination sensor 30. However, such a discussion would be largely repetitious and is not believed necessary for those skilled in this art to arrive at an understanding of this embodiment of the invention. Suffice it to say that the plot of the drag coefficient of a sphere $C_s$ in FIG. 7 illustrates that a sphere has more desirable characteristics than a rod. However, in the past, a sphere has not been seriously considered as a sensing element due to the mechanical problems that are involved.

By utilizing the novel construction developed for the previously discussed combination sensor 30, the mechanical problems associated with a sphere type sensor have now been solved with significant practical results. Curves C and D in FIG. 22 demonstrate actual test results of the combination sensor 30 and a sphere type sensor 50 with ¾ inch spheres 51 pressed into a ⅛ inch circular disc 52. It will be noted that there is a distinct advantage from the standpoint of consistency sensitivity for the sphere type sensor 50 as shown by curve D over the regular combination sensor plotted on curve C in the region below 2.25 percent consistency. This is, of course, exactly the region where improved performance is indicated on the $C_s$ curve in FIG. 7 but which has heretofore not been possible to achieve.

The sphere type sensor 50 may also be preferred over the regular combination sensor 30 for certain process applications depending on the critical range of flow sensitivity. As shown in FIG. 23, the flow sensitivity curves for both sensors 30, 50 have been plotted for three different consistency levels. From these curves it can be readily seen that the sphere type sensor 50 is less sensitive to flow rate change than the combination sensor 30 over most of the range for each consistency level.

From the above discussion, it can be appreciated that each of the illustrated embodiments of the invention have certain areas in which they produce better performance results than the others as well as significantly improved results over the prior art. Accordingly, the particular embodiment of the invention that is chosen for use in a certain fluid consistency or viscosity sensing application will depend on the critical range consistency sensitivity, flow sensitivity and the other sensitivity variables for that application. In this connection it will also be appreciated that other modifications of the novel sensing element of the present invention can also be constructed to meet specific consistency sensing requirements.

I claim as my invention:

1. A sensing element for a torque type consistency measuring device adapted for rotation in a fluid medium comprising, in combination, a hub, a thin circular disc concentrically mounted on said hub and having substantially smooth opposite surfaces, and a plurality of sensor segments carried by said disc and disposed so that respective portions of said segments project equally from said opposite surfaces, the exposed area of said surfaces between said segments being substantially greater than the area thereof occupied by said segments whereby said disc serves to hydraulically divide the relative fluid flow over said opposite surfaces thereof and said segments serve to change the said fluid flow and the development of the boundary layer phenomenon over said opposite surfaces.

2. A sensing element as defined in claim 1 wherein said plurality of sensing segments carried by said disc are formed with substantially semi-cylindrical portions projecting equally from opposite surfaces of said disc and are located outwardly from said hub so as to leave smooth surfaces on said disc adjacent said hub.

3. A sensing element as defined in claim 1 wherein the respective segment portions on opposite surfaces of said disc combine to define rod-like members extending outwardly from adjacent said hub to adjacent the circumferential edge of said disc.

4. A sensing element as defined in claim 3 wherein each of said segments is carried on said disc substantially along the path of a true involute thereof.

5. A sensing element as defined in claim 1 wherein said plurality of sensing segments are generally spherically shaped with substantially hemispherical portions of said segments projecting equally from opposite surfaces of said disc.

6. A sensing element as defined in claim 5 wherein said spherical segments are carried on said disc substantially along a plurality of involute-like paths.

7. A sensing element as defined in claim 6 wherein at least one of said spherical segments on each of said involute-like paths is also located on another of said involute-like paths at the point of intersection thereof.

8. A sensing element as defined in claim 5 wherein said spherical segments are located on said disc in a plurality of concentric circles.

References Cited by the Examiner
UNITED STATES PATENTS

| 2,076,816 | 4/1937 | Hess | 73—59 |
| 3,182,494 | 5/1965 | Beatty et al. | 73—59 X |

DAVID SCHONBERG, *Primary Examiner.*